United States Patent [19]
Bornstein

[11] 4,130,515
[45] Dec. 19, 1978

[54] LIGNIN-BASED COMPOSITION BOARD BINDER COMPRISING A COPOLYMER OF A LIGNOSULFONATE, MELAMINE AND AN ALDEHYDE

[75] Inventor: Leopold F. Bornstein, Atlanta, Ga.
[73] Assignee: Georgia-Pacific Corporation, Portland, Oreg.
[21] Appl. No.: 811,596
[22] Filed: Jun. 30, 1977
[51] Int. Cl.$^2$ .............................. C08L 97/00
[52] U.S. Cl. ................... 260/17.5; 156/331; 428/526
[58] Field of Search ............ 260/17.5; 428/526; 156/331

[56] References Cited

U.S. PATENT DOCUMENTS

| | | | |
|---|---|---|---|
| 2,562,898 | 8/1951 | Norris et al. | 260/17.3 |
| 2,622,979 | 12/1952 | Keim | 92/3 |
| 2,786,008 | 3/1957 | Herschler | 154/132 |
| 2,794,790 | 6/1957 | Marshall et al. | 260/17.5 |
| 2,849,314 | 8/1958 | Goss | 92/3 |
| 3,011,998 | 12/1961 | D'Alelio | 260/17.5 |
| 3,017,303 | 1/1962 | Ayers | 154/15.9 |
| 3,076,738 | 2/1963 | Uschmann | 156/331 |
| 3,093,604 | 6/1963 | Ayers | 260/17.2 |
| 3,093,605 | 6/1963 | Ayers | 260/17.2 |
| 3,093,609 | 6/1963 | Feigley et al. | 260/23.7 |
| 3,117,098 | 1/1964 | Eberl et al. | 260/17.5 |
| 3,304,346 | 2/1967 | D'Alelio | 260/17.5 |
| 3,597,375 | 8/1971 | Ludwig et al. | 260/17.5 |
| 3,658,638 | 4/1972 | Ludwig et al. | 156/235 |
| 3,677,884 | 7/1972 | Bornstein | 161/262 |
| 3,864,290 | 2/1975 | Pepplen et al. | 260/17.5 |
| 3,886,101 | 5/1975 | Felicetta et al. | 260/17.5 |
| 3,931,072 | 6/1976 | Coyle | 260/17.5 |
| 3,940,352 | 2/1976 | Wennerblom et al. | 260/17.5 |
| 3,956,207 | 5/1976 | Blackmore et al. | 260/17.5 |
| 3,968,294 | 7/1976 | Robitschek et al. | 428/213 |
| 3,975,319 | 8/1976 | Larsen et al. | 260/17.5 |
| 3,990,928 | 11/1976 | Schmidt-Hellerau et al. | 260/17.5 |
| 3,994,850 | 11/1976 | Willegger et al. | 260/17.5 |
| 4,026,744 | 5/1977 | Elmer | 260/17.5 |

FOREIGN PATENT DOCUMENTS 1404536  9/1975  United Kingdom .............. 260/17.5

OTHER PUBLICATIONS

Forss et al., *Paperi ja Puu–Papper o Trä*, No. 11, 1976, pp. 817–824.
Shen, *Forest Products Journal*, vol. 24, No. 2, 1974, pp. 38–44.

*Primary Examiner*—M. J. Welsh
*Attorney, Agent, or Firm*—Schuyler, Birch, Swindler, McKie and Beckett

[57] ABSTRACT

A lignin-based resin binder for use in the manufacture of composition board is produced by the in situ copolymerization of a major portion of a lignosulfonate salt with melamine and formaldehyde. This resin binder employs lignosulfonate levels up to about 70 percent without any of the deleterious effects normally associated with lignin-based resin systems. The resulting binder is completely compatible with conventional composition board processes and produces a board with superior stability under adverse conditions involving high humidity and temperature over a board produced with a standard typical urea-formaldehyde resin as presently in use.

36 Claims, No Drawings

LIGNIN-BASED COMPOSITION BOARD BINDER COMPRISING A COPOLYMER OF A LIGNOSULFONATE, MELAMINE AND AN ALDEHYDE

BACKGROUND OF THE INVENTION

1. Field of the Invention

This invention relates to a lignin-based melamine formaldehyde resin suitable for use as an adhesive binder in composition board applications.

2. Description of the Prior Art

Lignosulfonates have adhesive characteristics to a limited extent and numerous publications teach using lignosulfonate as an adhesive or the addition of lignosulfonates to adhesives such as phenolic adhesives, as an extender or a replacement of a resin constituent. In U.S. Pat. No. 2,849,314 lignosulfonate is treated with ammonia and then reacted with an aldehyde, an amine, or a hydroxy aromatic compound to obtain a thermosetting resin. U.S. Pat. Nos. 2,786,820 and 3,296,159 likewise disclose a reaction of lignin with aldehyde in preparation of water soluble thermosetting adducts which may be used as adhesives or added to phenol-formaldehyde adhesives. Using lignosulfonate to replace a portion of the phenol in preparation of phenolic adhesives is taught in U.S. Pat. Nos. 2,395,375; 3,658,638; 3,597,375; 3,677,884; 3,886,101; 3,940,352; 3,956,207; and 3,931,072. Different molecular weight lignosulfonate were also used as extenders in phenolic adhesives as reported by Julius Benko in Volume 44, No. 12, pages 849–854 of the TAPPI (December, 1961) published by the Technical Association of the Paper and Pulp Industry. Further, water insoluble lignin is commonly added as fillers in phenol-formaldehyde plywood adhesives.

The lignosulfonate containing binder compositions of the prior art suffer from a number of serious drawbacks. First of all, the polymerized lignin materials contain fewer active sites on the ring structure to form linkages. A lignin resin will, therefore, be weaker than a fully reacted typical resin of the known type. In addition, the sulfonic acid groups present in the lignosulfonates result in inferior water resistance of the cured resin. While some of the lignosulfonate containing resins based on phenolics have somewhat better water resistance, these products require higher press temperatures and longer press cycles—both conditions undesirable and sometimes even intolerable in composition board plants. Many composition board processes utilizing lignin based adhesives also require additional board treatments such as post-curing at elevated temperatures. In general, all prior art lignin containing binders possess the major drawbacks of being slow curing and requiring high press temperatures.

SUMMARY OF THE INVENTION

It is, therefore, an object of the present invention to provide a lignin-based composition board binder which does not suffer from the deleterious effects of the prior art binders based on mixtures of phenolic and lignosulfonates.

It is also an object of the present invention to formulate a resin binder having physical characteristics such as viscosity range, solid content, pH and the like in the limits established for presently used resins in order that it can be used in standard composition board processes.

It is a further object of the present invention to provide a resin binder which will cure under customary conditions, i.e., curing temperatures, resin to fibers ratios, curing cycles and pH conditions, thus making this binder suitable for use in plant operations now utilizing urea-formaldehyde or phenol-formaldehyde resins.

It is also an object of the present invention to provide a resin binder which will respond to commonly used catalysts.

Another object of the present invention is to eliminate the necessity of any additional board treatments such as post curing at elevated temperatures.

Another object of the present invention is to reduce the evolution of fumes and volatiles especially of excessive formaldehyde during handling and manufacturing steps.

It is also an object of the present invention to provide a binder system which will result in a markedly reduced tendency towards hydrolysis and attendant formaldehyde release in service under unfavorable conditions such as high humidity and/or temperatures.

Another object of the present invention is to provide a resin binder which has reduced detrimental affect on the cellulose fibers and corrosive affect on processing equipment.

In accordance with these and other objectives the present invention relates to a thermosetting resin composition board binder comprising a copolymer of a lignosulfonate, melamine and an aldehyde, the copolymer prepared by the in situ reaction under alkaline conditions of a lignosulfonate salt, melamine and an aldehyde.

The present invention also relates to a process for preparing a thermosetting resin composition board binder which comprises copolymerizing in situ, under alkaline conditions, a lignosulfonate salt, melamine, and an aldehyde.

The present invention further relates to a process for producing cured composition board comprising the steps of mixing a particulate cellulosic material with a thermosetting resin binder, the binder comprising a copolymer of a lignosulfonate, melamine and an aldehyde, the copolymer prepared by the in situ reaction under alkaline conditions of a lignosulfonate salt, melamine, and an aldehyde; and consolidating the mixture under heat and pressure to form a board-like product and to cure the resin binder.

In another aspect, the present invention also relates to a composition board comprising a plurality of consolidated cellulosic particles bound into board-like form by a cured, crosslinked, infusable resin copolymer of lignosulfonate, melamine and an aldehyde, the copolymer prepared by the reaction under alkaline conditions, of a lignosulfonate salt, melamine and an aldehyde.

DETAILED DESCRIPTION OF THE INVENTION

This invention relates primarily to adhesive resin binders for use in composition board manufacture. By the term composition board, applicant intends to include particleboard, chipboard, medium density board, Mende board, plywood, and the like.

The basic ingredient of the resin binder system of the present invention comprises a lignosulfonate salt. Lignin is a polymeric substance of substituted aromatics which is the essential binder in trees, plants, and vegetable tissue associated with cellulose and other plant constituents. While there is some variation in the chemical structure and of other constituents found in the plant, depending upon the type of plant, place where the plant is grown, and also upon the method used in recovery or isolation of the particular constituents from plant tissue, the basic structure and properties of these materials are similar and upon sulfonation form a well-known group of materials referred to as "lignosulfonate" or "sulfonated lignin." The reactions and properties of lignosulfonates and lignin are covered in the text, *The Chemistry of Lignin* by F. E. Brauns et al, Academic Press, New York, N.Y. (1960).

One of the main sources of sulfonated lignin is the residual pulping liquors obtained in pulp and paper industry where lignocellulosic materials such as wood, straw, corn stalks, baggasse, and the like are processed by well known methods to recover the cellulose or pulp. In the sulfite pulping process, lignocellulosic material is digested with a sulfite or bisulfite to sulfonate the lignin and obtain a residual product commonly referred to as "spent sulfite liquor" containing the sulfonated lignin. In other processes the residual pulping liquor or lignin as obtained from the process may not be a sulfonated product. However, the residual liquors or products containing the lignin portion may be sulfonated by the various known methods to the degree desired.

Spent sulfite liquor or other sulfonated lignin products obtained upon sulfonation of residual pulping liquors generally contain other constituents besides sulfonated lignin or lignosulfonates. The products may contain carbohydrates, degradation products of carbohydrates, and resinous materials as well as other organic and inorganic constituents. Although these nonlignin constituents may be removed it is not necessary to do so. Further, the lignosulfonates or products containing the lignosulfonates may be subjected to different treatment such as for example acid treatment, alkaline or heat treatment, oxidation or fermentation to remove or modify some of the nonlignin constituents or for other purposes. Generally, the basic phenylpropane polymeric structure of the lignin constituents and properties and characteristics of these products are not destroyed unless the treatment is unusually severe. In addition, the treated or nontreated products may be fractionated to obtain a particular lignosulfonated fraction or polymerized to increase the molecular weight. The high molecular weight lignosulfonates remain operative as long as they are water soluble and the molecular weight has not been increased to the extent that the product becomes a flocculent which is well known. The lignosulfonate salt employed according to the present invention can be based on sodium, calcium or ammonium. Preferred are the sodium lignosulfonate salts.

The second component of the resin binder of the present invention is melamine. Unlike urea or formaldehyde products containing lignosulfonates the reaction of melamine with the lignosulfonate inherently compensates for the inferior water resistance of lignosulfonates alone and further enhances the reactivity level resulting in temperatures and cure cycles approaching those routinely used composition board processes. Therefore, the lignosulfonate-melamine resins of the present invention exhibit the curing speed and temperature characteristics of a urea binder while approaching the water resistance characteristics of phenolic binders. These advantageous properities are a result of the excellent affinity of melamine resins to lignosulfonates. Melamine resins readily form in situ crosslinks with lignosulfonates. This feature can be simply illustrated by checking the water tolerance characteristics of such a copolymer. While typical melamine resin can tolerate only a very limited proportion of water, usually not exceeding 1:1 ratio without precipitation, a melamine lignosulfonate copolymer yields a product with infinite water tolerances.

The third component of the resin binder of the present invention is an aldehyde. Included in this term are any of the well known class of aldehydes and aldehyde sources normally employed in producing thermosetting resin binders such as formaldehyde, paraformaldehyde, furfural, hexamine and the like.

The copolymer resin binder of the present invention is prepared by reacting under alkaline conditions a major portion of a lignosulfonate with melamine and formaldehyde. In its broadest form this copolymer can contain from about 25 to 75 percent lignosulfonate, about 9 to 30 percent melamine, and from about 15 to 45 percent formaldehyde (50 percent solution).

Preferred are component levels in the following ranges:

| | |
|---|---|
| Lignosulfonate | 50 to 70 |
| Melamine | 9 to 20 |
| Formaldehyde | 15 to 30 |

Good results have been obtained with the following formulation:

| | | |
|---|---|---|
| Sodium lignosulfonate (45 percent) | 70.45 | parts by weight |
| Melamine | 9.2 | " |
| Formaldehyde (50 percent) | 15.85 | " |
| Methanol | 2.65 | " |
| Water | 1.78 | " |
| Caustic Soda (50 percent) | 0.05 | " |

In its preferred form the process of the present invention comprises charging all the above ingredients except melamine to a reaction vessel. After a short mixing period the melamine is added and the mixture is heated at a temperature of about 80° to 100° C. until a viscosity in the range of 250 to 350 cps is achieved. pH conditions in the range of about 9 to 10 should be maintained. The specifications of the resulting copolymer resin produced according to the above formulations are as follows:

| | |
|---|---|
| Solids content | 40 to 50 percent |
| Viscosity at 25° C | 250 to 350 cps |
| pH at 25° C | 9.2 to 9.6 |
| Water dilutability | infinite |

Methanol use in the above formulation is not essential. The function of this methanol is to control the resin viscosity by the partial methylation of melamine resin in the forming stage. The sodium lignosulfonate was supplied in water solution with pH adjusted by means of caustic soda to the level of 9 to 9.5.

For some particleboard plant operations a resin with somewhat higher solids content may be desirable. Higher water content resins add to the moisture of fibers and interfere with tack, proper mat formation and curing speed. In order to raise the solids content of the formulation above, the lignosulfonate was subjected to vacuum distillation to a solid content of 50–52 percent at 50° C. The following formulation was employed:

| | |
|---|---|
| Distilled sodium lignosulfonate | 70.76 |
| Melamine | 9.12 |
| Formaldehyde (50 percent) | 15.67 |

| | |
|---|---|
| Methanol | 2.63 |
| Water | 1.75 |
| Caustic Soda (50 percent) | 0.05 |

All the materials except melamine are initially charged to reactor. After a short mixing of these components the melamine is added. The charge is then rapidly reacted at 83° to 85° C. to a Brookfield Viscosity of 250 cps followed by rapid cooling. This resin formulation results in the following properties:

| | |
|---|---|
| Solids content | 51–53 percent |
| Viscosity 25° C. | 275–325 cps |
| pH at 25° C. | 8.9 to 9.4 |
| Water dilutability | infinite |

In another embodiment of the present invention, the sodium lignosulfonate component of the copolymer can be prereacted with phenol, followed by addition of formaldehyde and melamine in the proportions established for the basic formulation above. The amount of phenol can be varied from 5 to 15 percent based on lignosulfonate solids. The resulting resin had a solids content of about 52–53 percent, viscosity in the acceptable range and good water resistance. As above, the alternative approach embodies the same basic concept of polymerization in situ of melamine resin with a lignosulfonate (this one phenol-reinforced).

In a further embodiment a superior lignin based resin giving better board strength was prepared according to the basic formulation with the prereaction of lignosulfonate with 2 to 5 percent formaldehyde. This prepolymerized, formaldehyde-containing lignosulfonate can then be copolymerized in situ with melamine and formaldehyde in the above-described fashion.

The resin binder of the present invention may be used to make any of the known types of composition board. These include three-layer boards, with a core and two face layers, and homogeneous boards, with only one layer. In general, the process of using the binder of the present invention comprises applying the resin binder to the wood particles or chips and consolidating the mixture under heat and pressure to form a board-like product and cure the binder. The binder can comprise from about 6 percent to about 12 percent by weight of the mixture. Catalysts to promote the cure may be employed in the known manner. In general, pressures of between about 400 psig and 800 psig may be employed. Temperatures in the range of about 135° C. to about 175° C. are suitable. Press times generally range from about 3 to about 15 minutes depending on construction of the board, e.g., thickness.

The practice of the composition board making process according to the present invention is beneficially influenced by the binder composition in that the evolution of fumes and volatiles, especially excessive formaldehyde fumes caused by hydrolysis is markedly decreased. Accordingly, the process is not only less objectionable to those who employ it, but there is less detrimental effect on the cellulose fibers and the binder itself and there is essentially no corrosive effect on the processing equipment. This board has been shown to be highly resistant to deterioration by hydrolysis under high humidity and temperature conditions.

The following examples are included for illustrative purposes only and are not intended to limit the scope of the invention.

EXAMPLE 1

This example demonstrates the preparation of the resin binder of the present invention. The formulation of the resin binder was as follows:

| | |
|---|---|
| Sodium lignosulfonate (45 percent) | 70.45 |
| Melamine | 9.2 |
| Formaldehyde (50 percent) | 15.85 |
| Methanol | 2.65 |
| Water | 1.78 |
| Caustic Soda (50 percent) | 0.05 |

Formaldehyde, water, caustic soda, methanol and lignosulfonate are charged in sequence into the reaction vessel and after a short mixing period the melamine is added. The complete charge is then reacted at a temperature of about 80° to 100° C. until a viscosity in the range of 250 to 350 cps at 25° C. is obtained. The pH of the water solution of lignosulfonate was pH adjusted with a caustic soda to a level of about 9 to 9.5.

EXAMPLE 2

This example demonstrates the use of the resin binder of the present invention in particleboard manufacture. A three-layer particleboard approximately ⅜ inch thick was prepared with the resin of Example 1 under the following conditions:

| | |
|---|---|
| Resin content in the faces | 9 percent resin solids catalyzed with 0.005 percent of ammonium sulfate |
| Resin content in the core | 7 percent resin solids catalyzed with 0.02 percent of ammonium sulfate |
| Wood Chips | Southern pine |
| Pressure | 500 psi to ⅜ inch stop |
| Pressure time, press time and press temperature | 4 minutes at 300° F. |
| Wax content | 1 percent |

The particleboard resulting from the above process had the following properties:

| | |
|---|---|
| Density | 53 pounds per cubic foot (approximate) |
| Modules of rupture (M.O.R.) | 300 lbs. (average) |
| Internal bond (I.B.) | 103 lbs. (average) |
| Water absorption after 24 hrs. at 25° C. | 25 percent (average) |
| Thickness swell after 24 hrs. at 25° C. | 6.5 percent (average) |

The above properties demonstrate that the resin binder of the present invention can be employed in standard composition board processes and results in a board product having properties which are favorably comparable with standard binder presently in use.

EXAMPLE 3

This example demonstrates the improvement achieved by the in situ lignosulfonate copolymerization of the present invention over (1) a melamine resin blended with lignosulfonate, (2) a phenolic resin blended with lignosulfonate, (3) a urea formaldehdye resin blended with a lignosulfonate, and (4) a typical straight urea-formaldehyde resin used in particleboard manufacture. Particleboards from each of the above resin systems were produced. All boards were of the homogeneous type containing a resin level of 8 percent based on the resin solids and pressed at 310° F. for 5 minutes, except for the phenolic board which was pressed for 7½ minutes. No wax addition was used. The board properties were as follows:

|  | Density pcf | IB (psi) | Water Absorption % (24 hrs. no wax) |
|---|---|---|---|
| Copolymerized board per above formulation | 45 | 125–150 | 83 |
| Melamine resin blended with lignosulfonate | 45 | 90 | — |
| Phenolic resin blended with lignosulfonate | 45 | 53 | — |
| Urea/formaldehyde resin blended with lignosulfonate | 45 | 75 | — |
| Typical urea/formaldehyde resin | 45 | 150–175 | 83 |

EXAMPLE 4

This example demonstrates the unexpected superior board stability under adverse conditions involving high humidity and higher prevailing temperatures. In order to check the board for formaldehyde release the board sample was placed in a closed jar containing water in a separate container. The closed jar was placed in the oven at a temperature of 35° C. for a period of 20 hours. The jar was then evacuated and the amount of released formaldehyde determined. The amount of formaldehyde released from the board of the present invention was substantially lower than that from a standard commerical board prepared with a urea formaldehyde type binder. The amount of formaldehyde released indicates the tendency to hydrolysis of the binder. Such hydrolysis can lead to board disintegration under conditions very often occurring in actual installations, especially involving floor underlayments. The resistance of the board of the present invention to deterioration was also confirmed by a boiling water test. A urea-type commerical resin board placed in boiling water disintegrated in less than 15 minutes. The melamine-lignosulfonate board of the present invention withstood this test for approximately 90 minutes without disintegration. The amount of release of irritating and harmful formaldehyde is quite important in actual service and is subject to objectionable complaints from board users.

While certain specific embodiments of the invention have been described with particularity herein, it should be recognized that various modifications thereof will appear to those skilled in the art. Therefore, the scope of the invention is to be limited solely by the scope of the claims appended hereto.

I claim:

1. A thermosetting resin composition board binder comprising a copolymer of lignosulfonate, melamine, and an aldehyde, said copolymer prepared by the in situ reaction under alkaline conditions of a lignosulfonate salt, melamine, and an aldehyde.

2. The binder of claim 1 wherein said lignosulfonate is present in an amount of about 25 to 75 percent by weight, said melamine is present in an amount of about 9 to 30 percent by weight and said aldehyde is present in an amount of about 15 to 45 percent by weight.

3. The binder of claim 1 wherein said lignosulfonate salt is sodium lignosulfonate.

4. The binder of claim 1 wherein said melamine is partially methylated by the addition of methanol.

5. The binder of claim 1 wherein said aldehyde is formaldehyde.

6. The binder of claim 1 wherein said lignosulfonate salt is prereacted with phenol to copolymerization.

7. The binder of claim 1 wherein said lignosulfonate salt is prereacted with additional aldehyde prior to copolymerization.

8. The binder of claim 1 comprising about 70 percent by weight lignosulfonate, about 10 percent by weight melamine and about 15 percent by weight formaldehyde.

9. A process for preparing a thermosetting resin composition board binder which comprises copolymerization in situ, under alkaline conditions a lignosulfonate salt, melamine, and an aldehyde.

10. The process of claim 9 wherein said lignosulfonate is present in an amount of about 25 to 75 percent by weight, said melamine is present in an amount of about 9 to 30 percent by weight and said aldehyde is present in an amount of about 15 to 45 percent by weight.

11. The process of claim 9 wherein said lignosulfonate salt is sodium lignosulfonate.

12. The process of claim 9 wherein said melamine is partially methylated by adding methanol to the reaction mixture.

13. The process of claim 9 wherein said aldehyde is formaldehyde.

14. The process of claim 9 wherein said copolymerization is carried out at a temperature of about 80° to 100° C.

15. The process of claim 9 wherein said copolymerization is carried out at a pH of about 9 to 10.

16. The process of claim 9 additionally comprising the step of prereacting said lignosulfonate with phenol prior to said copolymerization.

17. The process of claim 16 wherein said phenol is added in an amount of about 5 to 15 percent by weight based on said lignosulfonate solids.

18. The process of claim 9 additionally comprising the step of prereacting said lignosulfonate with additional formaldehyde prior to said copolymerization.

19. The process of claim 18 wherein said additional formaldehyde is added in amount of from about 2 to 5 percent by weight based on said lignosulfonate solids.

20. A process for producing cured composition board comprising the steps of
(a) mixing a particulate cellulosic material with a thermosetting resin binder, said binder comprising a copolymer of a lignosulfonate, melamine and an aldehyde, said copolymer prepared by the in situ reaction under alkaline conditions of a lignosulfonate salt, melamine, and an aldehyde; and
(b) consolidating said mixture under heat and pressure to form a board-like product and to cure said resin binder.

21. The process of claim 20 wherein said binder is present in an amount of from about 6 to 12 percent by weight.

22. The process of claim 20 wherein said lignosulfonate is present in an amount of about 25 to 75 percent by weight, said melamine is present is an amount of about 9 to 30 percent by weight and said aldehyde is present in an amount of about 15 to 45 percent by weight.

23. The process of claim 20 wherein said lignosulfonate salt is sodium lignosulfonate.

24. The process of claim 20 wherein said melamine is partially methylated by the addition of methanol.

25. The process of claim 20 wherein said aldehyde is formaldehyde.

26. The process of claim 20 wherein said lignosulfonate salt is prereacted with phenol prior to copolymerization.

27. The process of claim 20 wherein said lignosulfonate salt is prereacted with additional aldehyde prior to copolymerization.

28. The process of claim 20 wherein said binder comprises about 70 percent by weight lignosulfonate, about 10 percent by weight melamine and about 15 percent by weight formaldehyde.

29. A composition board comprising a plurality of consolidated cellulosic particles bound into board-like form by a cured, crosslinked, infusable resin copolymer of lignosulfonate, melamine and an aldehyde, said copolymer prepared by the reaction under alkaline conditions, of a lignosulfonate salt, melamine and an aldehyde.

30. The composition board of claim 29 wherein said lignosulfonate is present in an amount of about 25 to 75 percent by weight, said melamine is present in an amount of about 9 to 30 percent by weight and said aldehyde is present in an amount of about 15 to 45 percent by weight.

31. The composition board of claim 29 wherein said lignosulfonate salt is sodium lignosulfonate.

32. The composition board of claim 29 wherein said melamine is partially methylated by the addition of methanol.

33. The composition board of claim 29 wherein said aldehyde is formaldehyde.

34. The composition board of claim 29 wherein said lignosulfonate salt is prereacted with phenol prior to copolymerization.

35. The composition board of claim 29 wherein said lignosulfonate salt is prereacted with additional aldehyde prior to copolymerization.

36. The composition board of claim 29 wherein said copolymer comprises about 70 percent by weight lignosulfonate, about 10 percent by weight melamine and about 15 percent by weight formaldehyde.

* * * * *